US012566712B2

(12) United States Patent
Liljedahl

(10) Patent No.: US 12,566,712 B2
(45) Date of Patent: Mar. 3, 2026

(54) RING BUFFER WITH MULTIPLE HEAD POINTERS

(71) Applicant: Arm Limited, Cambridge (GB)

(72) Inventor: Eric Ola Harald Liljedahl, Lund (SE)

(73) Assignee: Arm Limited, Cambridge (GB)

( * ) Notice: Subject to any disclaimer, the term of this patent is extended or adjusted under 35 U.S.C. 154(b) by 50 days.

(21) Appl. No.: 17/754,124

(22) PCT Filed: Sep. 23, 2020

(86) PCT No.: PCT/GB2020/052293
§ 371 (c)(1),
(2) Date: Mar. 24, 2022

(87) PCT Pub. No.: WO2021/064352
PCT Pub. Date: Apr. 8, 2021

(65) Prior Publication Data
US 2022/0374365 A1 Nov. 24, 2022

(30) Foreign Application Priority Data
Sep. 30, 2019 (GB) ...................................... 1914097

(51) Int. Cl.
*G06F 12/00* (2006.01)
*G06F 12/10* (2016.01)

(52) U.S. Cl.
CPC ................................... *G06F 12/10* (2013.01)

(58) Field of Classification Search
CPC .......... G06F 12/10; G06F 9/546; G06F 9/544; G06F 5/10
See application file for complete search history.

(56) References Cited

U.S. PATENT DOCUMENTS

| | | | |
|---|---|---|---|
| 6,571,301 B1 * | 5/2003 | Nakahara | ................... G06F 5/14 712/1 |
| 2002/0129196 A1 | 9/2002 | Volk et al. | |
| 2009/0235029 A1 * | 9/2009 | Mouton | .............. G06F 12/0864 711/E12.001 |
| 2013/0091332 A1 | 4/2013 | Vankov | |
| 2014/0149694 A1 * | 5/2014 | Lee | ........................... G06F 5/12 711/159 |

(Continued)

OTHER PUBLICATIONS

Microsoft Computer Dictionary, p. 438, 2002 (Year: 2002).*

(Continued)

*Primary Examiner* — Arvind Talukdar
(74) *Attorney, Agent, or Firm* — NIXON & VANDERHYE P.C.

(57) ABSTRACT

Apparatuses and methods of operating such apparatuses are disclosed, where the apparatus provides ring buffer storage to hold queued elements. Multiple head pointers are stored and maintained with respect to the ring buffer, wherein the multiple head pointers have a multiplicity N. When a dequeuing operation is performed with respect to an element queued in the ring buffer, reference is made to a selected head pointer of the multiple head pointers and a slot index value is derived. An element held in a slot corresponding to the slot index value is dequeued and the value of the selected head pointer is increased by N. Support for concurrent dequeuing operations is thus provided, in that write contention for a single head pointer is avoided.

13 Claims, 8 Drawing Sheets

(56) References Cited

U.S. PATENT DOCUMENTS

Figure 1:
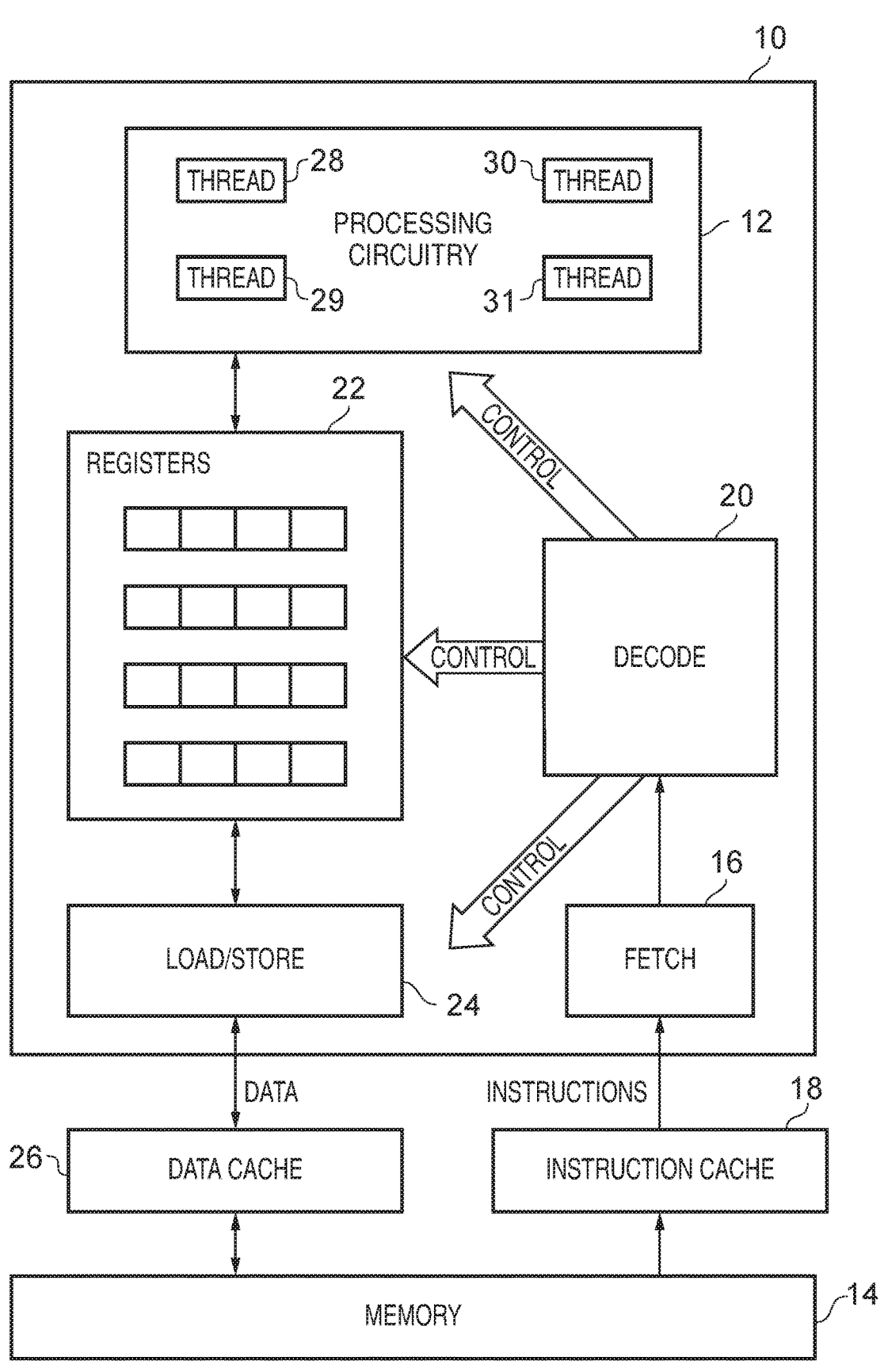

| | | | |
|---|---|---|---|
| 2018/0018359 A1* | 1/2018 | Liljedahl | H04L 47/36 |
| 2018/0081624 A1* | 3/2018 | Liljedahl | G06F 13/1673 |
| 2018/0203666 A1* | 7/2018 | Okumura | G06F 5/14 |
| 2018/0246820 A1* | 8/2018 | Mirza | G06F 13/1673 |
| 2021/0303375 A1* | 9/2021 | Stevens | G06F 9/544 |

OTHER PUBLICATIONS

Kirsch Christoph M., et al. "Fast and Scalable, Lock-Free k-FIFO Queues", Sep. 30, 2013 (Sep. 30, 2013), Big Data Analytics in the Social and Ubiquitous Context : 5th International Workshop on Modeling Social Media, MSM 2014, 5th International Workshop on Mining Ubiquitous and Social Environments, Muse 2014 and First International Workshop on Machine LE, XP047042285, ISBN: 978-3-642-17318-9; abstract, Section 3, 3.1.

* cited by examiner

RING BUFFER WITH MULTIPLE HEAD POINTERS

The present techniques relate to data processing. More particularly it relates to the administration of a ring buffer in a data processing apparatus.

There are various data processing contexts in which data items, such as data packets, are processed making use of a ring buffer. Data item indications are stored in slots of the ring buffer corresponding to a particular ordering of the data items. When the data items indicated by the content of ring buffer are to be processed they must be "dequeued" from the ring buffer. It may be desirable to perform the processing of the data items in a parallelised manner (i.e. by multiple concurrent processing processes) in order to seek to improve data processing throughput. However the dequeuing operation can quickly become a scalability bottleneck, because of the need to update a ring buffer head pointer when dequeuing a data item, where it is understood that the head pointer indicates the oldest item in the set of items queued in the ring buffer. Correspondingly, a tail pointer may be used to indicate the youngest item in the queue. This updating of the head pointer must be performed by each processing element seeking to dequeue elements from the ring buffer and each will require temporary exclusive access to the head pointer and must carry out an atomic update procedure. For this reason an atomic compare-and-swap (CAS) operation may typically be used for this part of the dequeuing procedure. This however results in a bottleneck since there is write contention to one specific location per ring buffer.

At least some examples provide an apparatus comprising: ring buffer storage circuitry to store components of a ring buffer comprising multiple slots to hold queued elements; and data processing circuitry to perform dequeuing operations with respect to elements queued in the ring buffer, wherein the ring buffer storage circuitry is arranged to store multiple head pointers, wherein the multiple head pointers have a multiplicity N and comprise: a first head pointer indicative of a first slot capable of holding a queued element; and at least one further head pointer indicative of at least one further slot capable of holding a queued element, wherein a dequeuing operation comprises: reading a slot index value from a selected head pointer of the multiple head pointers; dequeuing an element held in a slot corresponding to the slot index value; and increasing the selected head pointer to indicate an updated slot index value which is greater than the slot index value.

At least some examples provide a method of data processing comprising: storing components of a ring buffer comprising multiple slots to hold queued elements; and performing dequeuing operations with respect to elements queued in the ring buffer, wherein the storing comprises storing multiple head pointers, wherein the multiple head pointers have a multiplicity N and comprise: a first head pointer indicative of a first slot capable of holding a queued element; and at least one further head pointer indicative of at least one further slot capable of holding a queued element, wherein a dequeuing operation comprises: reading a slot index value from a selected head pointer of the multiple head pointers; dequeuing an element held in a slot corresponding to the slot index value; and increasing the selected head pointer to indicate an updated slot index value which is greater than the slot index value.

At least some examples provide an apparatus comprising: means for storing components of a ring buffer comprising multiple slots to hold queued elements; and means for performing dequeuing operations with respect to elements queued in the ring buffer, wherein the means for storing comprises means for storing multiple head pointers, wherein the multiple head pointers have a multiplicity N and comprise: a first head pointer indicative of a first slot capable of holding a queued element; and at least one further head pointer indicative of at least one further slot capable of holding a queued element, wherein the means for performing dequeuing operations is arranged to perform a dequeuing operation comprising: reading a slot index value from a selected head pointer of the multiple head pointers; dequeuing an element held in a slot corresponding to the slot index value; and increasing the selected head pointer to indicate an updated slot index value which is greater than the slot index value.

Figure 2:
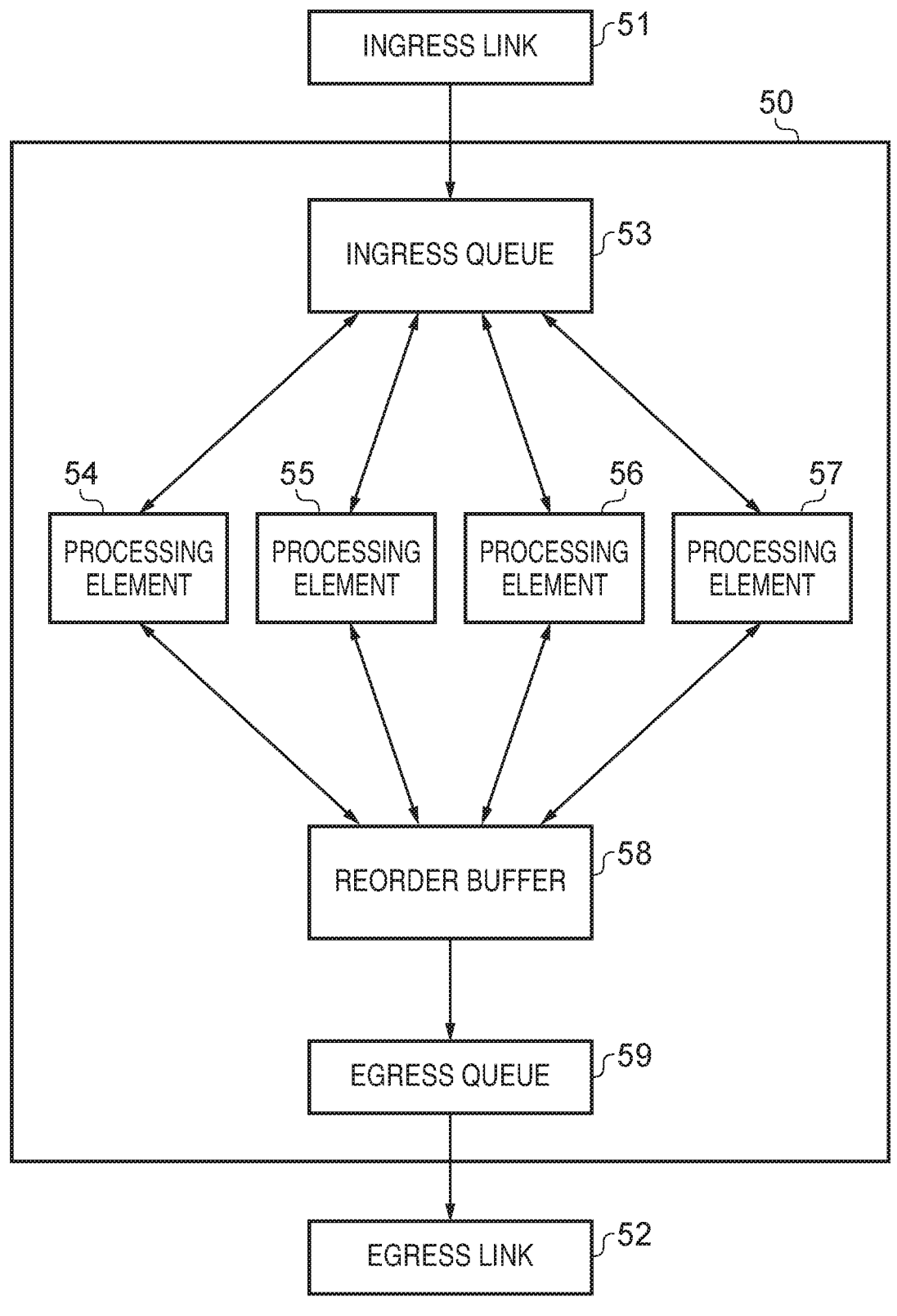
Figure 3:
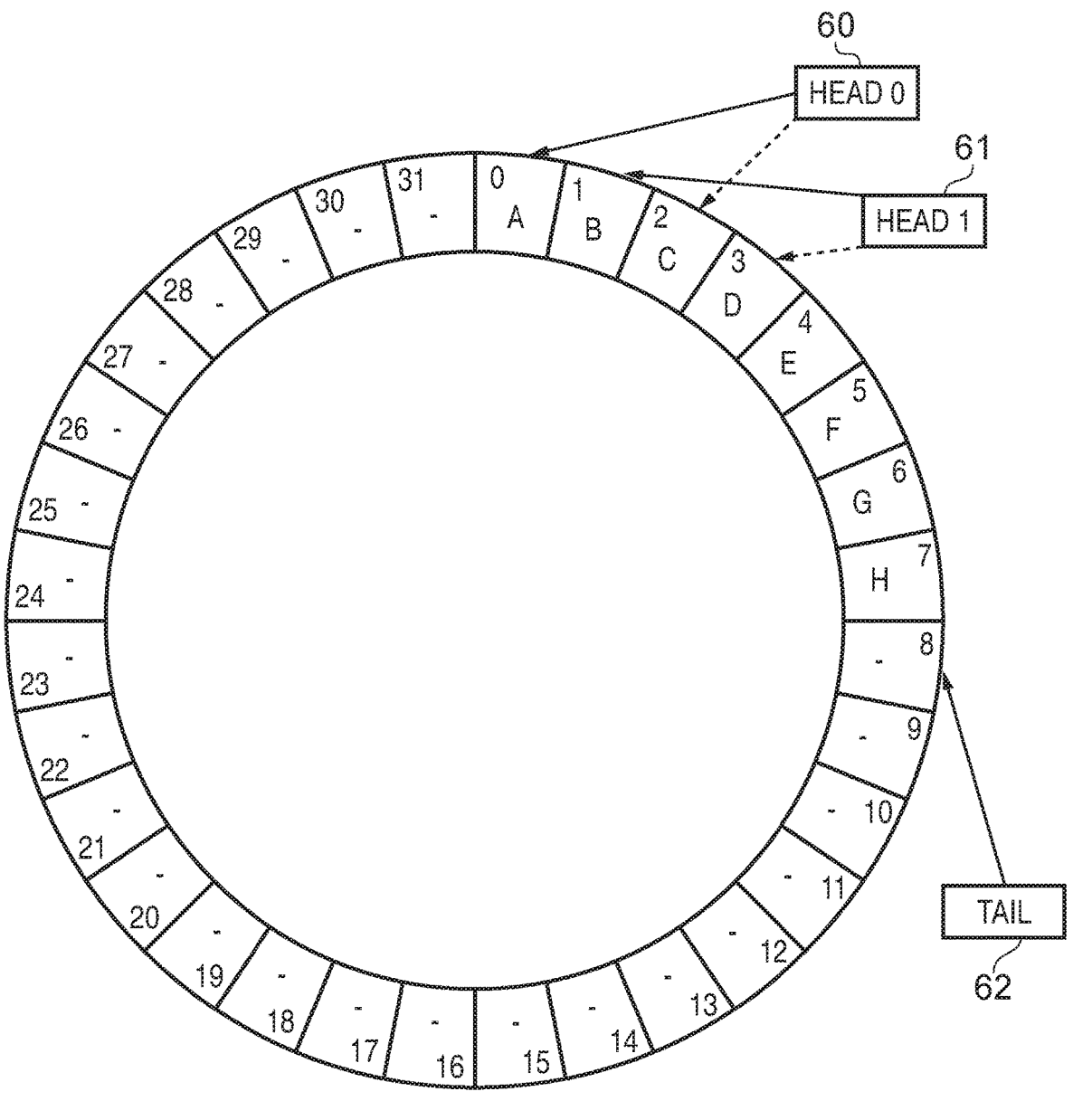
Figure 4A:
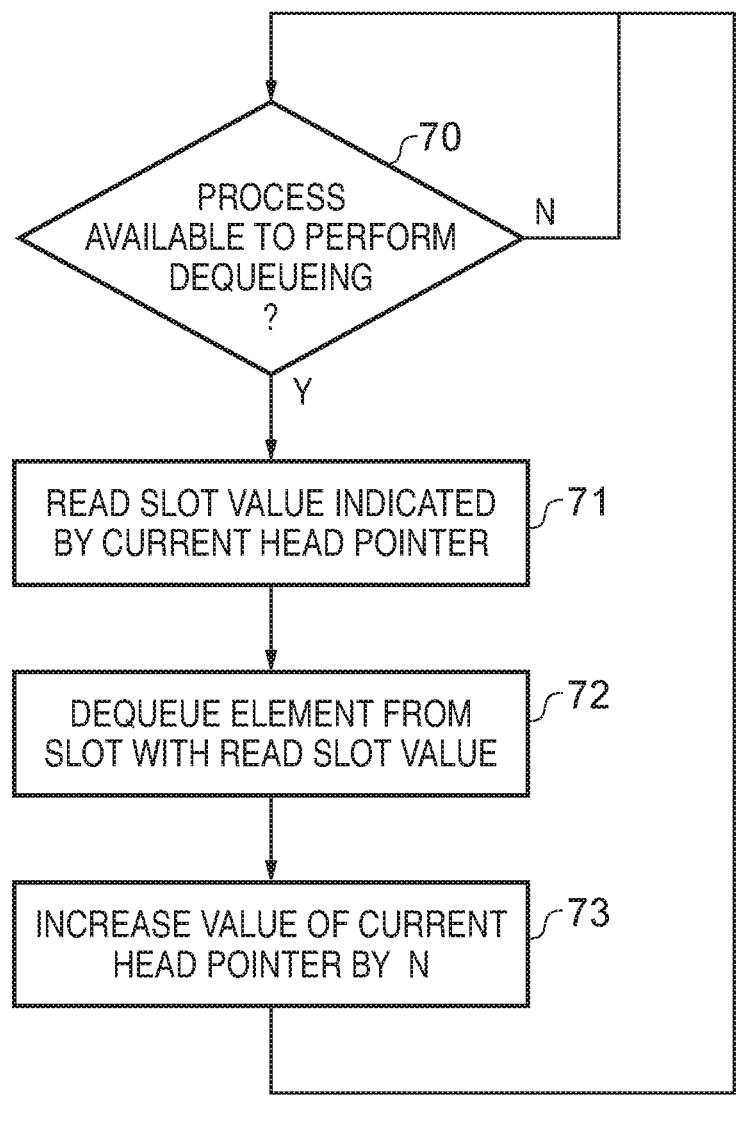
Figure 4B:
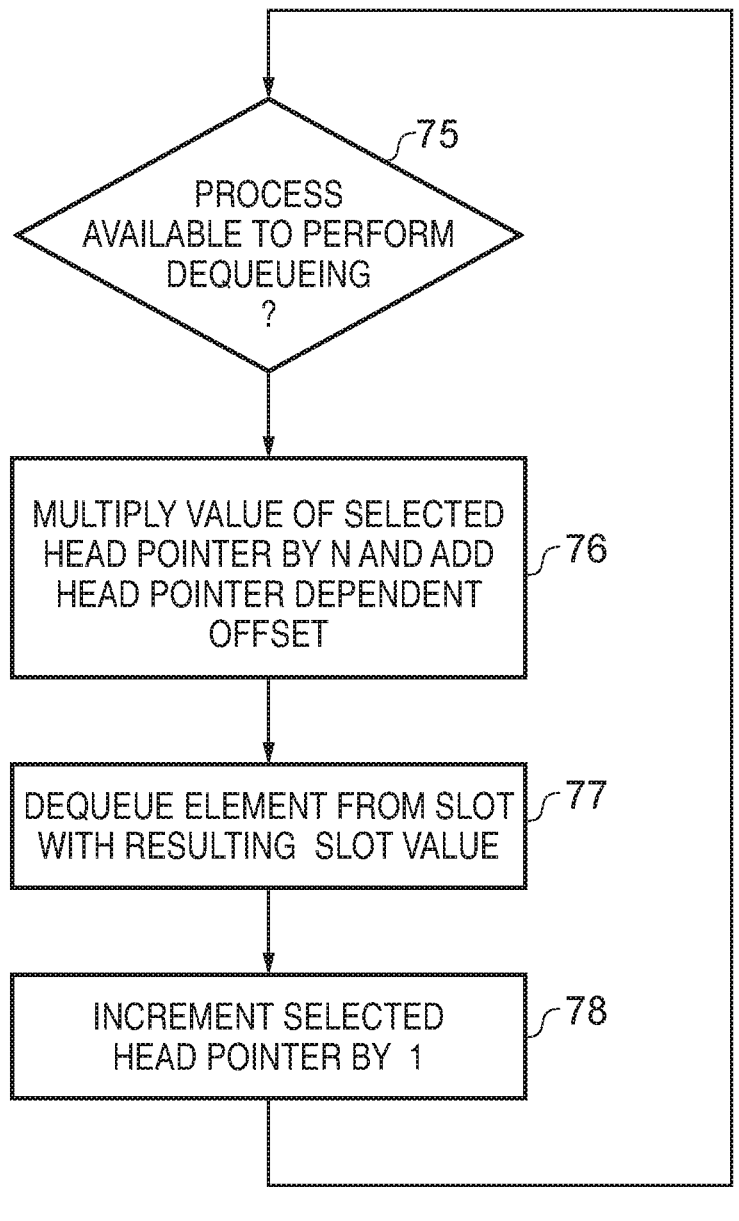
Figures 5, 6A, 6B:
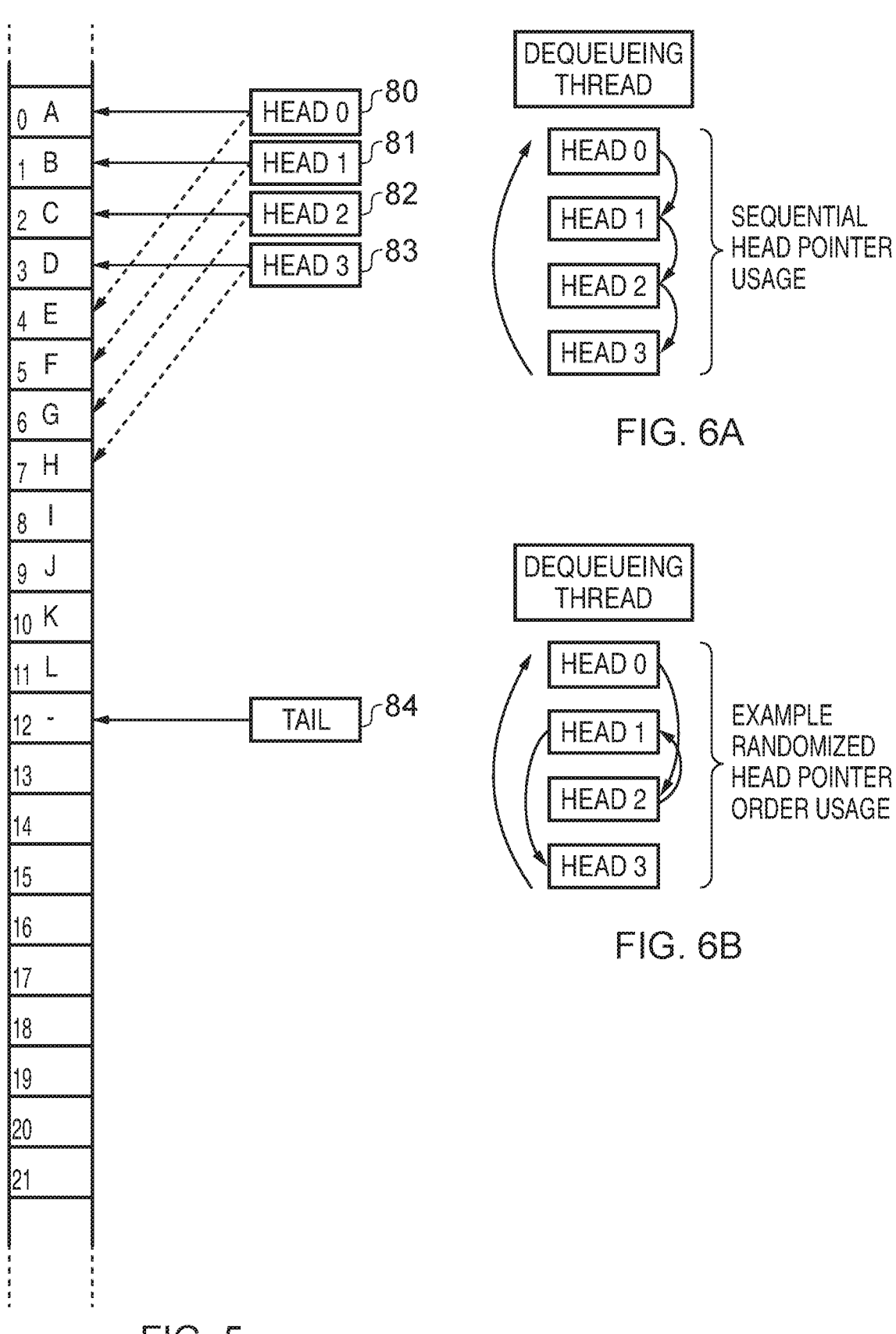
Figure 7:
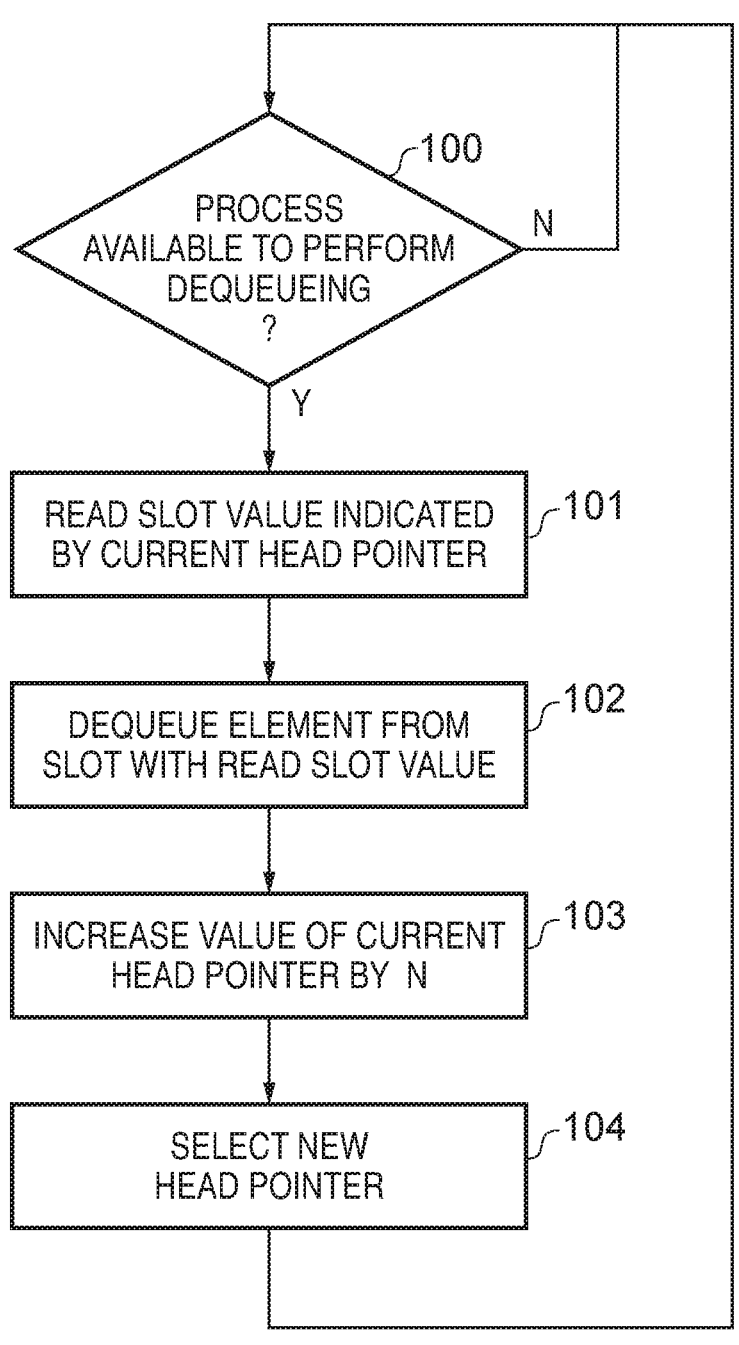
Figure 8:
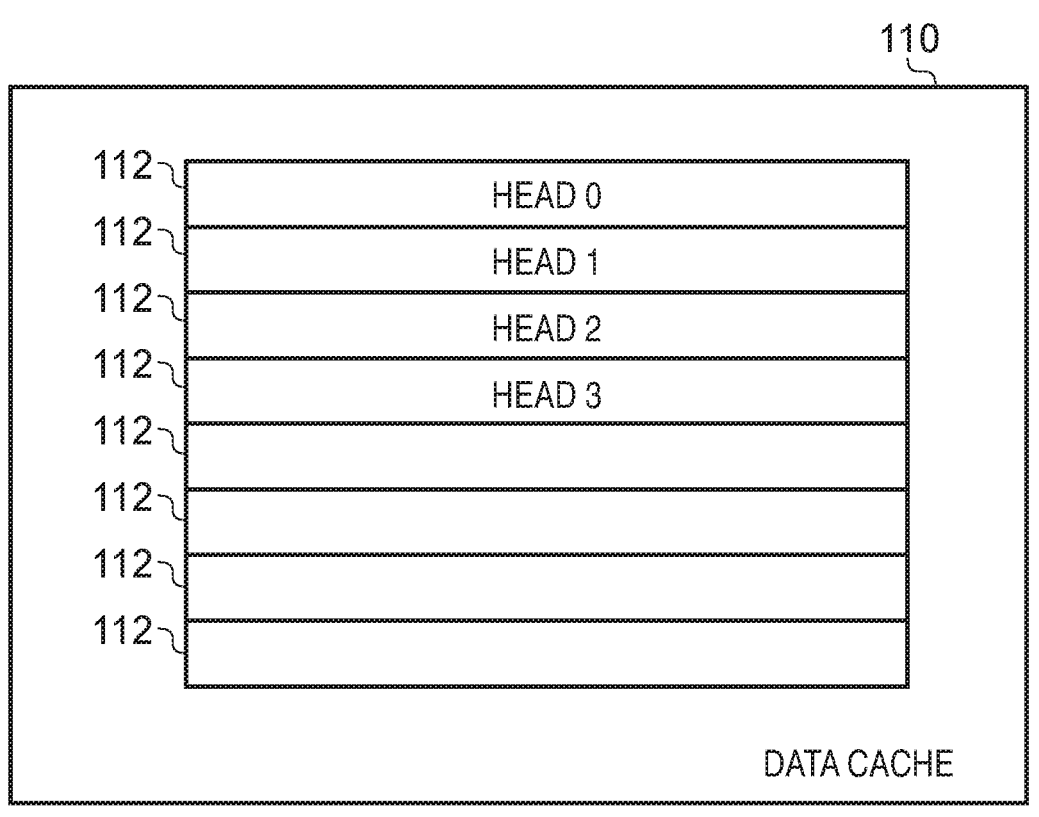

The present techniques will be described further, by way of example only, with reference to embodiments thereof as illustrated in the accompanying drawings, to be read in conjunction with the following description, in which:

FIG. 1 schematically illustrates a data processing apparatus in accordance with some embodiments;

FIG. 2 schematically illustrates an apparatus in accordance with some embodiments, which performs data processing on data items received via an ingress link to be passed to an egress link;

FIG. 3 schematically illustrates a ring buffer with multiple head pointers and a tail pointer in accordance with some embodiments;

FIGS. 4A and 4B are flow diagrams showing sequences of steps which are taken according to methods of some embodiments;

FIG. 5 schematically illustrates a ring buffer with multiple head pointers and a tail pointer in accordance with some embodiments;

FIG. 6A schematically illustrates sequential head pointer usage in accordance with some embodiments;

FIG. 6B schematically illustrates randomised head pointer usage in accordance with some embodiments;

FIG. 7 is a flow diagram showing a sequence of steps which are taken according to the method of some embodiments; and FIG. 8 schematically illustrates the storage of multiple head pointers in a data cache, wherein each head pointer is stored in a different cache line in accordance with some embodiments.

At least some embodiments described herein provide an apparatus comprising: ring buffer storage circuitry to store components of a ring buffer comprising multiple slots to hold queued elements; and data processing circuitry to perform dequeuing operations with respect to elements queued in the ring buffer, wherein the ring buffer storage circuitry is arranged to store multiple head pointers, wherein the multiple head pointers have a multiplicity N and comprise: a first head pointer indicative of a first slot capable of holding a queued element; and at least one further head pointer indicative of at least one further slot capable of holding a queued element, wherein a dequeuing operation comprises: reading a slot index value from a selected head pointer of the multiple head pointers; dequeuing an element held in a slot corresponding to the slot index value; and increasing the selected head pointer to indicate an updated slot index value which is greater than the slot index value.

Accordingly the present techniques propose that the administration of the ring buffer is performed making use of N head pointers, where each head pointer indicates a slot in the ring buffer which can hold a queued element. When a queued element is dequeued a selected head pointer of the N head pointers indicates a slot from which a queued element can be read and, once the queued element has been read, the selected head pointer is increased to indicate the next slot from which a queued element might be read with reference to that head pointer. Accordingly the set of N head pointers point to a set of N slots and for example the sequence of head pointers slot targets may for example be repeated for sequential blocks of N slots. The use of multiple head pointers thus addresses the above-described bottleneck of write contention at one specific head pointer location per ring buffer, and may thus improve the scalability and parallelisation of the dequeuing operations.

In some embodiments the dequeuing operation further comprises returning the slot index value. Where the slot index value corresponds to the position of the queued element in an ordered sequence of queued elements, reference to this slot index value thus enables that position to be identified and made use of in a subsequent processing stage.

For example in some embodiments the data processing circuitry is arranged to perform reordering operations with respect to elements dequeued from the ring buffer by the dequeuing operations, wherein the reordering operations comprise re-establishing an ordering of the elements dequeued from the ring buffer with reference to the slot index value returned for each element dequeued. Thus the slot index value returned as part of the dequeuing operation for each element dequeued can be made use of in order to re-establish a defined ordering of the elements. This therefore further means that, in order to preserve that defined ordering, the dequeuing operation does not need to be carried out in an order directly corresponding to the original sequence. That is to say, elements can be dequeued from the ring buffer in an order which differs from the specified ordering. Hence, for example, an instant dequeuing operation may dequeue an element other than the oldest element in the ring buffer.

The multiple head pointers may be made use of and in particular selected from in a variety of ways, but in some embodiments the data processing circuitry is arranged to perform the dequeuing operation comprising: selecting the selected head pointer from amongst the multiple head pointers such that the selected head pointer for a current performance of the dequeuing operation is different to a previous head pointer selected for a most recent performance of the dequeueing operation. This supports a balanced use of the different head pointers and decreases the chance of one head pointer falling behind the others, leaving a set of particularly old elements still awaiting dequeuing.

The selection from amongst the multiple head pointers may be performed in a variety of ways, but in some embodiments the data processing circuitry is arranged to perform the dequeuing operation comprising: selecting the selected head pointer from amongst the N multiple head pointers such that when the previous head pointer is an $n^{th}$ head pointer amongst the N multiple head pointers the selected head pointer is an $(n+1)^{th}$ head pointer amongst the N multiple head pointers. Thus an incremental approach of head pointer selection may be taken, where the head pointers are selected in sequence.

In other embodiments the data processing circuitry is arranged to perform the dequeuing operation comprising: selecting the selected head pointer from amongst the N multiple head pointers according to a predetermined selection sequence of the N multiple head pointers. The predetermined sequence can be arbitrarily defined.

In some embodiments the data processing circuitry is arranged to perform the dequeuing operation comprising:

selecting the selected head pointer from amongst the N multiple head pointers as a randomly selected head pointer amongst the N multiple head pointers. In some such embodiments the selecting the selected head pointer from amongst the N multiple head pointers excludes the previous head pointer selected for the most recent performance of the dequeueing operation, i.e. a random selection is made amongst the head pointers, but it is guaranteed that it is not the previous head pointer. A randomised selection of head pointers may thus also be used in order to balance the use of the multiple head pointers.

The increasing the selected head pointer in the dequeuing operation may be various performed. In some embodiments in the dequeuing operation the increasing the selected head pointer comprises increasing the selected head pointer by N to indicate an updated slot index value which is N greater than the slot index value. Thus where the set of N head pointers point to a set of N slots, the sequence of head pointers slot targets is repeated for sequential blocks of N slots.

In other embodiments initially all head pointers are set to 0, and in the dequeuing operation: the selecting the selected head pointer comprises multiplying the selected head pointer by N and adding a head pointer specific offset; and the increasing the selected head pointer comprises increasing the selected head pointer by 1 to indicate an updated slot index value which is N greater than the slot index value. Thus initially all head pointers are set to a value of 0. Then when used the head pointer is incremented by 1 (if one element was dequeued), but then before a head pointer is used it is multiplied by N before actually accessing the ring slots. Further, in such a case, the selected head pointer is read, multiplied by N and then an offset (0 . . . N-1) specific to the particular head pointer is added, depending on which head pointer was selected. The outcome is essentially the same as the above mentioned increment by N example. The multiplication by a power-of-two (for power-of-two N) may be done using a bit-wise shift.

A dequeuing operation may in some circumstances dequeue only a single element, but in some embodiments the data processing circuitry is arranged to perform the dequeuing operation to dequeue multiple elements queued in the ring buffer, wherein the dequeueing operation comprises: dequeuing an integer number X of further elements held in further slots corresponding to the slot index value plus X times N; and increasing the head pointer by X times N to indicate the updated slot index value which is X times N greater than the slot index value. Accordingly the dequeuing operation can be arranged to dequeue multiple elements, taken from non-consecutive slot locations.

In some embodiments the apparatus further comprises a cache associated with the data processing circuitry, wherein a configuration of the N multiple head pointers and a cache line size of the cache are selected such that each head pointer is cached in a different cache line of the cache. With each head pointer for the ring buffer stored in a different cache line, write contention is decreased and for example multiple (N) threads can dequeue elements concurrently, thus increasing the overall dequeuing rate from the ring buffer.

The data processing circuitry of the apparatus may be variously configured, but in some embodiments the data processing circuitry is arranged to perform multi-threaded data processing, and wherein the dequeuing operations comprise concurrent dequeuing operations performed by parallel threads executing on the data processing circuitry. The ability of the present techniques to allow parallel (concurrent) access to the multiple head pointers is leveraged in such embodiments.

At least some embodiments described herein provide a method of data processing comprising: storing components of a ring buffer comprising multiple slots to hold queued elements; and performing dequeuing operations with respect to elements queued in the ring buffer, wherein the storing comprises storing multiple head pointers, wherein the multiple head pointers have a multiplicity N and comprise: a first head pointer indicative of a first slot capable of holding a queued element; and at least one further head pointer indicative of at least one further slot capable of holding a queued element, wherein a dequeuing operation comprises: reading a slot index value from a selected head pointer of the multiple head pointers; dequeuing an element held in a slot corresponding to the slot index value; and increasing the selected head pointer by N to indicate an updated slot index value which is N greater than the slot index value.

At least some embodiments described herein provide an apparatus comprising: means for storing components of a ring buffer comprising multiple slots to hold queued elements; and means for performing dequeuing operations with respect to elements queued in the ring buffer, wherein the means for storing comprises means for storing multiple head pointers, wherein the multiple head pointers have a multiplicity N and comprise: a first head pointer indicative of a first slot capable of holding a queued element; and at least one further head pointer indicative of at least one further slot capable of holding a queued element, wherein the means for performing dequeuing operations is arranged to perform a dequeuing operation comprising: reading a slot index value from a selected head pointer of the multiple head pointers; dequeuing an element held in a slot corresponding to the slot index value; and increasing the selected head pointer by N to indicate an updated slot index value which is N greater than the slot index value.

Some particular embodiments are now described with reference to the figures.

FIG. 1 schematically illustrates an apparatus 10 which may embody various examples of the present techniques. The apparatus 10 illustrated in FIG. 1 comprises data processing circuitry 12 which performs data processing operations on data items in response to a sequence of instructions. These instructions are retrieved from a memory 14 and, in a manner with which one of ordinary skill in the art will be familiar, fetch circuitry 16 and an instruction cache 18 are provided to support this. The instructions caused to be retrieved from the memory 14 by the fetch circuitry 16 are passed to the instruction decoding circuitry 20, which generates control signals which are arranged to control various aspects of the configuration and operation of the processing circuitry 12, as well as of a set of registers 22 and a load/store unit 24. It will be appreciated that the illustration of FIG. 1, for the purposes of providing a brief coherent overview, is only provided at a high level of abstraction, and many detailed aspects of the configuration of such a data processing apparatus (with which one of ordinary skill in the art will be familiar) are omitted merely for clarity of illustration and discussion. Data values required by the data processing circuitry 12 (as defined in the instructions which it executes) are retrieved from the memory 14, may be cached in the data cache 26 (which may in fact comprise a hierarchy of cache levels) and are stored in the registers 22, in order to allow particular data operations on those data values to be carried out by the processing circuitry 12. Thus modified, a data item held in a register 22 may be caused to be stored back to memory (via the data cache 26). The retrieval of data items from the memory 14 and the storing of data items back to the memory 14 is administered by the load/store circuitry 24. Note also that four threads 28, 29, 30, and 31 are conceptually shown within the processing circuitry 12, illustrating the fact that this processing circuitry is multi-threaded, i.e. meaning that it can concurrently execute multiple data processing threads (i.e. sequences of instructions).

FIG. 2 schematically illustrates an apparatus 50 according to some embodiments. The apparatus 50 receives data packets via an ingress link 51, performs processing on these data packets, and passes them to an egress link 52. For example, the apparatus 50 may embody the data processing capability provided at a node in a connected network, where certain data processing is performed on data packets which pass through that node. Data items (packets) received by the ingress link 51 are queued in an ingress queue 53, which in accordance with the present techniques takes the form of a ring buffer. Accordingly, it will be recognised that this "queue" is to some degree conceptual in that received data items will typically be physically stored in data storage capacity of the apparatus 50, e.g. in the data cache 26 and/or the memory 14 in the example of FIG. 1, together with other metadata associated with the ring buffer structure (such as, according to the present techniques, multiple head pointers), which support the administration of the ring buffer. The apparatus 50 comprises four processing elements 54, 55, 56, and 57, each of which is arranged to perform data processing with respect to the data packets queued in the ingress queue 53. These four processing elements may be provided as physically independent data processing circuitry or may be provided as multiple threads executing on the same data processing circuitry. Thus, the processing elements 54-57 remove data items from the ingress queue 53 (a process referred to here as "de-queuing"), perform their respective data processing, and pass the processed data items to a reorder buffer 58. The reorder buffer 58 may also be embodied as a ring buffer structure. The provision of the reorder buffer 58 enables the de-queuing of data items from the ingress queue 53 to be out-of-order, i.e. a processing element is not constrained only to dequeue a data item from the head of the ingress queue (i.e. the oldest element in the ring buffer). Data items held in the ingress queue 53 are associated with a particular "slot" of the ring buffer that provides the ingress queue and thus has an associated slot number, corresponding to a sequence number for the data item. Each processing element 54-57 is arranged to pass an indication of this slot/sequence number (from which a particular data item is dequeued from the ingress queue) to the reorder buffer 58 once it has performed its processing. The operation of the reorder buffer can then allow the original (received) sequence ordering of the data items to be restored. In brief summary, this operation comprises storing an indication of a received data item in a slot of the reorder buffer corresponding to the sequence number associated with the data item (where this "enqueuing" of data items may occur out-of-order) and subsequently enforcing an in-order dequeuing procedure with respect to the ordered slots of the reorder buffer, such that the required ordering of the data items is re-established. Various techniques for operating such reorder buffers are known, such as that disclosed in US patent application publication 2018-0081624. From the reorder buffer 58 data items enter an egress queue 59, from where they are passed to the egress link 52.

FIG. 3 schematically illustrates a ring buffer according to some embodiments. The circular, wraparound nature of the ring buffer can be seen, where the first numbered slot of the ring buffer (slot 0) immediately follows the last numbered slot (slot 31). It will be recognised that a ring buffer may have a different number of slots to the ring buffer shown in FIG. 3, and the present techniques are not limited with regard to the overall number of slots. Example content, data items "A" to "H" are shown in the example of FIG. 3 as being held in slots 0-7. These data items are therefore ready to be de-queued for further processing. The further available, but empty, slots of the ring buffer (8-31) are shown to be currently empty ("-"), which may for example comprise these slots being populated with a null pointer. Indeed it is to be recognised that in the data structure which embodies the ring buffer, data item indicators, such as pointers, are preferably used in the place of the data items themselves, since this greatly facilitates the ease with which the data structure can be manipulated. As such the items A-H shown in FIG. 3 are in fact respective pointers indicating the respective data items at their storage location (e.g. in memory). Also shown in FIG. 3 are a first head pointer ("head 0") 60, a second head pointer ("head 1") 61, and a tail pointer ("tail") 62. Generally, these pointers are used to indicate to the relevant processing elements the availability of queued elements for dequeuing. Here, the first head pointer "head 0" 60 indicates the first (oldest) element available to dequeue, whilst the tail pointer 62 indicates the first empty slot, i.e. the slot number of the last (youngest) element queued in the ring buffer plus one. Note also that the second head pointer "head 1" 61 indicates the second element available to dequeue (item B in slot 1). Accordingly multiple head pointers are maintained for a ring buffer according to the present techniques. For simplicity of illustration and explanation, the example of FIG. 3 only shows there being two head pointers, but the present techniques are not limited to this number. A processing element referencing the ring buffer in order to find an element to dequeue makes use of one of the two head pointers (some options for the manner of selection of the head pointer will be discussed in more detail below with reference to the figures that follow). A processing element referring to the first head pointer 60 determines that the next element to dequeue is item A in slot 0. In carrying out a dequeuing operation the processing element therefore reads the first head pointer 60 to derive the required slot number (i.e. 0 in this case), dequeues the item from that slot (i.e. item A in this example), and updates the value of the head pointer. The value of the head pointer is updated by an increment which is equal to the number of head pointers used. Accordingly, in this example where there are two head pointers, the head pointer is updated by an increment of two, moving it from indicating slot 0 to indicating slot 2. This is indicated by the dashed arrow pointing to the slot 2 in FIG. 3. If instead the processing element refers to the second head pointer 61, it will determine that slot 1 contains the element to be dequeued, item B is dequeued therefrom, and the head pointer is also increased by two, thus updating head pointer 61 from indicating slot 1 to indicating slot 3. This is also indicated by a dashed arrow in FIG. 3.

FIG. 4A illustrates a sequence of steps which are taken according to the method of some embodiments. This represents a process carried out by a processing element accessing a ring buffer according to the present techniques and seeking to dequeue a queued element. The flow can be considered to begin at step 70 where it is determined if there is a process (e.g. a processing element) available to perform dequeuing. The flow loops on itself here until this condition is true. Thereafter the flow proceeds to step 71, where a slot (index) value indicated by the current head pointer is read. The reference here to a "current" head pointer is indicative of the fact that there are multiple head pointers available, and further detail is given below with respect to the allocation of, or selection of, a head pointer by a given processing element. Next at step 72 an element is dequeued from the ring buffer from the slot indicated by the slot (index) value read at step 71. Then at step 73 the value of the current head pointer is increased by N, where N is the number of head pointers which are used for this ring buffer. The flow then returns to step 70.

FIG. 4B illustrates an alternative sequence of steps (to those of FIG. 4B) which are taken according to the method of some embodiments. This represents a process carried out by a processing element accessing a ring buffer according to the present techniques and seeking to dequeue a queued element. Note that in this implementation all head pointers are initially set to a value of 0. The flow can be considered to begin at step 75 where it is determined if there is a process (e.g. a processing element) available to perform dequeuing. The flow loops on itself here until this condition is true. Thereafter the flow proceeds to step 76, where the value indicated by the current head pointer is multiplied by N and a head pointer dependent offset (0 to N-1, respectively) is added. As was the case for FIG. 4A the reference here to a "current" head pointer is indicative of the fact that there are multiple head pointers available, and further detail is given below with respect to the allocation of, or selection of, a head pointer by a given processing element. Next at step 77 an element is dequeued from the ring buffer from the slot indicated by the slot index value generated at step 76. Then at step 77 the value of the current head pointer is increased by 1. The flow then returns to step 70.

FIG. 5 schematically illustrates a ring buffer in some example embodiments. Comparing to FIG. 3 it will be noted that a linear presentation of the slots has been adopted in FIG. 5, but this does not affect the circular, wraparound nature of the ring buffer of FIG. 5 and it should be understood that a maximum slot number of the ring buffer will immediately precede slot 0. In the example of FIG. 5 there are four head pointers 80, 81, 82, and 83. These are shown in FIG. 5 as initially indicating a sequential set of slots (slot numbers 0-3) in which example elements A-D are queued. Thus, a processing element referencing the "head 0" pointer 80 will determine that slot 0 contains the next element to be dequeued. Once it has dequeued element A from slot 0 it updates head pointer 80 to indicate slot 4. Similarly a processing element which references the head pointer 81 will determine that slot 1 holds the next item to be dequeued and will therefore dequeue item B from slot 1, before updating head pointer 81 to indicate slot 5, and so on. In this example the process of FIG. 4A is used, so the updates to the head pointers are by an increment of four slots, corresponding to the use of four head pointers in this example embodiment. As before (i.e. as in the example of FIG. 3) a tail pointer 84 is shown in the example of FIG. 5, indicating the slot which immediately follows the last (youngest) item queued in the ring buffer. Note that a processing element is not limited to dequeuing one element from the ring buffer. For example when the processing element referencing the "head 0" pointer 80 of FIG. 5 determines that slot 0 contains the next element to be dequeued, it is not necessarily constrained to only dequeue element A from slot 0. The processing element could in the illustrated example of FIG. 5 be configured to dequeue not only element A from slot 0, but also element E from slot 4, and possibly also element I from slot 8. Similarly the processing element which references head pointer 81 could be configured to dequeue not only element B from slot 1, but also element F from slot 5, and possibly also element J from slot 9. The example content shown in FIG. 5 only allows for these processing elements to dequeue up to three queued elements as a group, since the tail pointer indicated the end of the queued sequence at the empty slot 12. Each processing element can determine the number of queued elements available to it to dequeue by reference to the tail pointer and the head pointer it is currently using. The number is given by (tail–head)/N where N is the number of head pointers in use. For example, the first processing element, referencing head pointer 80, can determined that it can dequeue up to (12–0)/4=3 queued elements.

FIG. 6A schematically illustrates the manner in which a dequeuing thread makes use of the head pointers. This example corresponds to that of FIG. 5 in which there are four head pointers. As can be seen in FIG. 6A the dequeuing thread has a policy of sequential head pointer usage, i.e. using the head pointers head 0 to head 3 in sequential order, and looping back to use head 0 after head 3. This approach of changing between different head pointers means that a balanced use of the different head pointers results and this helps to avoid usage of one head pointer from falling behind the others (thus leaving older elements still queued in the ring buffer). The switch of head pointer may be contingent on the thread having successfully dequeued an element from the slot indicated by its current head pointer, i.e. it won't move to using another head pointer until this is the case.

Sequential head pointer usage is only one manner in which the usage of the multiple head pointers may be administered, and FIG. 6B schematically illustrates another example implementation, where in this case a randomised approach is taken thus, once a first head pointer has been used, one of the head pointers is randomly selected. This could be a random selection between all of the head pointers or it could be a random selection between the head pointers other than the first head pointer. This randomisation of the selection should ensure that overall all head pointers are equally used. Hence as can be seen in the example of FIG. 3 the sequence of head pointer usage (which happened to occur in this snapshot) is head 0, head 2, head 1, head 3, head 0 but it will be appreciated that this is a purely exemplary sequence and any randomised sequence of head pointer usage might result.

FIG. 7 shows a sequence of steps which are taken according to the method of some embodiments. The process begins at step 100 where the flow waits until a process is available to perform dequeuing on the elements currently queued in the ring buffer. When this is the case the flow proceeds to step 101, where the available process reads the slot (index) value indicated by the current head pointer. Then at step 102 this slot of the ring buffer is accessed for the element queued there to be dequeued. The null pointer may be written to the corresponding slot once the element has been dequeued, though this is typically not usually necessary. However when reordering in a reorder buffer is being carried out, the ring slots need to be cleared after use in order to prepare for the next lap of the ring buffer, when the same slots are used again. When a ring buffer is just used as a FIFO, clearing slots on dequeue is normally not necessary. Then at step 103 the value of the current head pointer is increased by N (the number of head pointers being used in this implementation) and finally at step 104 a new head pointer is selected. This may for example be incremental (as in the case of FIG. 6A), randomised (as in the case of FIG. 6B), or any other chosen method of selecting a new (i.e.

different to the current head pointer) head pointer. The flow then returns to step 100. It will be noted therefore that the updating of the current head pointer corresponds to that of FIG. 4A, but that of FIG. 4B could equally be used here.

FIG. 8 schematically illustrates content of a data cache 110, which may for example be the data cache 26 schematically shown in FIG. 1. The data cache is shown as having capacity to store eight cache lines 112 and FIG. 8 shows the first four of these being populated by four head pointers (head 0-3). Of course this number of cache lines and this number of head pointers are arbitrary, and relatively small number of each have been selected for the figure, merely to simplify the illustration, but the present techniques are in not limited in the number of either. It is in particular to be noted that the head pointers are stored in different cache lines of the data cache 110. This may be achieved by suitable definition of the head pointers themselves (allowing for their respective size and the cache line size) and in particular their respective memory addresses. With the head pointers for the ring buffer located in different cache lines write contention is avoided and four threads (in this example where there are four head pointers) are able to dequeue elements concurrently from the ring buffer.

In brief overall summary, apparatuses and methods of operating such apparatuses are disclosed, where the apparatus provides ring buffer storage to hold queued elements. Multiple head pointers are stored and maintained with respect to the ring buffer, wherein the multiple head pointers have a multiplicity N. When a dequeuing operation is performed with respect to an element queued in the ring buffer, reference is made to a selected head pointer of the multiple head pointers and a slot (index) value is derived. An element held in a slot corresponding to the slot (index) value is dequeued and the value of the selected head pointer is increased by N. Support for concurrent dequeuing operations is thus provided, in that write contention for a single head pointer is avoided.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. An apparatus comprising:
ring buffer storage circuitry to store components of a ring buffer comprising multiple slots to hold queued elements; and,
data processing circuitry to perform dequeuing operations with respect to elements queued in the ring buffer,
wherein the ring buffer storage circuitry is arranged to concurrently store N multiple head pointers and only one tail pointer, wherein the N multiple head pointers and the tail pointer are associated with the queued elements, wherein the N multiple head pointers comprise:

a first head pointer indicative of a first slot capable of holding a queued element; and, at least one further head pointer indicative of at least one further slot capable of holding a queued element, wherein a dequeuing operation comprises:

reading a slot index value from a selected head pointer of the N multiple head pointers;

dequeuing an element held in a slot corresponding to the slot index value; and, increasing the selected head pointer by N, where N is an integer greater than 1, to indicate an updated slot index value which is N slots greater than the slot index value;

wherein the data processing circuitry is arranged to perform the dequeuing operation comprising:

selecting the selected head pointer from amongst the concurrently stored N multiple head pointers in a pseudo-randomized or sequential order, such that the selected head pointer for a current performance of the dequeuing operation is different from a previous head pointer selected for a most recent performance of the dequeueing operation.

2. The apparatus as claimed in claim 1, wherein the dequeuing operation further comprises returning the slot index value.

3. The apparatus as claimed in claim 2, wherein the data processing circuitry is arranged to perform reordering operations with respect to elements dequeued from the ring buffer by the dequeuing operations, wherein the reordering operations comprise re-establishing an ordering of the elements dequeued from the ring buffer with reference to the slot index value returned for each element dequeued.

4. The apparatus as claimed in claim 1, wherein the data processing circuitry is arranged to perform the dequeuing operation comprising:

selecting the selected head pointer from amongst the N multiple head pointers such that when the previous head pointer is an $n^{th}$ head pointer amongst the N multiple head pointers the selected head pointer is an $(n+1)^{th}$ head pointer amongst the N multiple head pointers.

5. The apparatus as claimed in claim 1, wherein the data processing circuitry is arranged to perform the dequeuing operation comprising:

selecting the selected head pointer from amongst the N multiple head pointers according to a predetermined selection sequence of the N multiple head pointers.

6. The apparatus as claimed in claim 1, wherein the data processing circuitry is arranged to perform the dequeuing operation comprising:

selecting the selected head pointer from amongst the N multiple head pointers as a pseudo-randomly selected head pointer amongst the N multiple head pointers.

7. The apparatus as claimed in claims 6, wherein the selecting the selected head pointer from amongst the N multiple head pointers excludes the previous head pointer selected for the most recent performance of the dequeueing operation.

8. The apparatus as claimed in claim 1, wherein initially all head pointers are set to 0, and wherein in the dequeuing operation:

the selecting the selected head pointer comprises multiplying the selected head pointer by N and adding a head pointer specific off set; and, the increasing the selected head pointer comprises increasing the selected head pointer by 1 to indicate an updated slot index value which is N greater than the slot index value.

9. The apparatus as claimed in claim 1, wherein the data processing circuitry is arranged to perform the dequeuing operation to dequeue multiple elements queued in the ring buffer, wherein the dequeueing operation comprises:

dequeuing an integer number X of further elements held in further slots corresponding to the slot index value plus X times N; and, increasing the head pointer by X times N to indicate the updated slot index value which is X times N greater than the slot index value.

10. The apparatus as claimed in claim 1, further comprising a cache associated with the data processing circuitry, wherein a configuration of the N multiple head pointers and a cache line size of the cache are selected such that each head pointer is cached in a different cache line of the cache.

11. The apparatus as claimed in claim 1, wherein the data processing circuitry is arranged to perform multi-threaded data processing, and wherein the dequeuing operations comprise concurrent dequeuing operations performed by parallel threads executing on the data processing circuitry.

12. A method comprising:

storing, in ring buffer storage circuitry, components of a ring buffer comprising multiple slots to hold queued elements; and, performing dequeuing operations with respect to elements queued in the ring buffer;

wherein the storing comprises concurrently storing N multiple head pointers and only one tail pointer, wherein the N multiple head pointers and the tail pointer are associated with the queued elements, wherein the N multiple head pointers comprise:

a first head pointer indicative of a first slot capable of holding a queued element; and, at least one further head pointer indicative of at least one further slot capable of holding a queued element, wherein a dequeuing operation comprises:

reading a slot index value from a selected head pointer of the N multiple head pointers;

dequeuing an element held in a slot corresponding to the slot index value; and, increasing the selected head pointer by N, where N is an integer greater than 1, to indicate an updated slot index value which is N slots greater than the slot index value;

and wherein the dequeuing operation further comprises:

selecting the selected head pointer from amongst the concurrently stored N multiple head pointers in a pseudo-randomized or sequential order, such that the selected head pointer for a current performance of the dequeuing operation is different from a previous head pointer selected for a most recent performance of the dequeueing operation.

13. An apparatus comprising:

means for storing components of a ring buffer comprising multiple slots to hold queued elements; and, means for performing dequeuing operations with respect to elements queued in the ring buffer, wherein the means for storing comprises means for concurrently storing N multiple head pointers and only one tail pointer, wherein the N multiple head pointers and the tail pointer are associated with the queued elements,
wherein the N multiple head pointers comprise:
a first head pointer indicative of a first slot capable of
holding a queued element; and
at least one further head pointer indicative of at least
one further slot capable of holding a queued element,
wherein the means for performing dequeuing operations
is arranged to perform a dequeuing operation compris-
ing:
reading a slot index value from a selected head pointer of the N multiple head pointers;
dequeuing an element held in a slot corresponding to
the slot index value; and,
increasing the selected head pointer by N, where N is
an integer greater than 1, to indicate an updated slot
index value which is N slots greater than the slot
index value;
wherein the means for performing dequeuing operations
is arranged to perform the dequeuing operation com-
prising:
selecting the selected head pointer from amongst the
concurrently stored N multiple head pointers in a
pseudo-randomized or sequential order, such that the
selected head pointer for a current performance of
the dequeuing operation is different from a previous
head pointer selected for a most recent performance
of the dequeueing operation.

\* \* \* \* \*